United States Patent [19]

Drylie

[11] Patent Number: 4,473,621

[45] Date of Patent: Sep. 25, 1984

[54] CADMIUM FREE GOLD ALLOYS

[75] Inventor: Vernon K. Drylie, Toronto, Canada

[73] Assignee: Johnson Matthey Limited, Toronto, Canada

[21] Appl. No.: 515,144

[22] Filed: Jul. 19, 1983

[51] Int. Cl.³ .............................................. C22C 5/02
[52] U.S. Cl. ................................... 428/576; 428/637; 428/671; 428/672; 420/512; 420/587; 219/85; 228/56
[58] Field of Search ............... 420/511, 512, 507, 587; 219/85 H, 146.22, 145.22; 228/263.11, 263.18; 428/637, 656, 671, 672, 576; 148/430

[56] References Cited

FOREIGN PATENT DOCUMENTS 977131  3/1951  France ................................ 420/587
2275271 2/1976  France ................................ 420/587
56-33142  4/1981  Japan ................................. 428/672
56-154299 11/1981 Japan ............................. 219/146.22

Primary Examiner—L. Dewayne Rutledge
Assistant Examiner—Debbie Yee
Attorney, Agent, or Firm—Fetherstonhaugh & Co.

[57] ABSTRACT

This invention relates to brazing alloys for use primarily in jewellery manufacture having compositions consisting of 30 to 80 weight % gold, 0 to 20 weight % silver, 20 to 60 weight % copper, 5 to 20 weight % zinc, 0 to 5.0.% of a group VIII metal as a grain refiner for gold, and 0.5 to 3.0 weight % indium. These alloys have desirable properties, particularly in the 14 karat gold range, without the health hazards associated with the use of cadmium.

4 Claims, No Drawings

CADMIUM FREE GOLD ALLOYS

FIELD OF INVENTION

This invention relates to gold solder alloys.

PRIOR ART

A large proportion of karat gold jewellery solders with liquidus temperatures in the 650° C.–800° C. range (so called extra-easy to medium solders) contain the element cadmium, which is known to pose a health hazard both in the manufacture and use. The health problem relates to the toxicity of cadmium and of its oxide when inhaled as the vapour. The threshold limit value (TLV) for Cd exposure is 0.05 mg/m$^3$. The solders can often be used at or exposed to temperatures above 765° C., the boiling point of cadmium. From the manufacturer's end, making these alloys with due regard for health involves the use of expensive melt fume extraction equipment. From the user's end, use is often made of these alloys without benefit of elaborate fume extraction equipment, increasing the risks to health.

I have overcome the above problems by using indium instead of cadmium to reduce the liquidus temperature of a gold/silver/copper/nickel/zinc alloy to the desired level. I have found that the mechanical working properties (ductility) of the indium-bearing alloys are equal to or better than the cadmium-bearing alloys.

The removal of cadmium not only reduced the health risks, but also the capital costs involved in meeting current standards in melting operations. For example, such items as furnace hoods and elaborate fume extraction and collection equipment are no longer required.

In jewellery applications, excellent ductility is a requirement for end uses such as ring repair and solder cored wire for fashion chains. In the latter application, excellent ductility of both the jacket and the core alloys is mandatory for the hammering operation, where reduction in area without anneals may exceed 80%.

Although some 10kt and 18kt gold solder alloys (42% and 75% gold, resp.) containing cadmium exhibit adequate ductility for such chain finishing operations as hammering, the large majority of known 14kt gold solder alloys (58% gold) containing cadmium do not. The difficulties experienced in guaranteeing the gold fineness of a diamond milled 14kt chain is disclosed in U.S. Pat. No. 4,297,416. In U.S. Pat. No. 4,297,416 there is described a mechanical solution to the problem, where gold jacket alloys, ductile gold solder alloys and fine gold are mechanically combined to produce a product which may be milled to a depth without reducing the overall fineness. The chief disadvantage lies in the mechanical processing required to build up such a wire.

If, on the other hand, a solder is of the identical fineness as the jacket, no complicated buildup is required and mechanical tolerances of the jacket and core can be loose. The 14kt solder alloys which I have developed exhibit superior ductility to the cadmium bearing equivalents and hence can be used to build a simple jacket/core combination which retains overall fineness regardless of the severity of diamond milling.

It is an object of the present invention to provide a gold solder alloy in which the required liquidus temperature is achieved without the use of cadmium.

It is a further object of the present invention to achieve the required liquidus temperature while retaining desirable mechanical working properties in a gold solder alloy by substituting indium for the cadmium content.

It is a further object of the present invention to provide a 14 karat solder alloy which has the ductility required to build a simple jacket/core combination solder cored wire.

According to one aspect of the present invention, a gold solder alloy comprises 30 to 80% gold, 0 to 20% silver, 20 to 60% copper, 5 to 20% zinc, 0 to 5.0% of a group VIII metal grain refiner for gold, and 0.5 to 3.0% indium.

According to a further aspect of the present invention, a gold solder alloy comprises 30 to 80% gold, 0 to 20% silver, 20 to 60% copper, 5 to 20% zinc, 0 to 5.0% (preferably 0 to 1.0%) of a grain refining alloy element selected from nickel and cobalt, and 0.5 to 3.0% indium.

The group VIII metal such as nickel and/or cobalt is added when a fine grain size is required but may be ommitted when grain size is not important in the subsequent use of the alloy.

Examples of typical gold solder alloys which may be prepared by simple melting together of the various components are as follows:

1. A high temperature 10kt gold solder alloy comprises about 42% gold, 40% copper, 15.5% zinc, 0.5% nickel, 2% indium.
2. A low temperature 10kt gold solder alloy comprises about 42% gold, 30% copper, 16.5% silver, 9% zinc, 0.5% nickel, 2% indium.
3. A high temperature 14kt gold solder alloy comprises about 58% gold, 27% copper, 5% silver, 7.5% zinc, 0.5% nickel, 2% indium.
4. A low temperature 14kt gold solder alloy comprises about 58% gold, 29% copper, 10.5% zinc, 0.5% nickel, 2% indium.
5. A high temperature 18kt gold solder alloy comprises about 75% gold, 10% copper, 6% silver, 6.5% zinc, 0.5% nickel, 2% indium.
6. A low temperature 18kt gold solder alloy comprises about 75% gold, 6% copper, 10% silver, 6.5% zinc, 0.5% nickel, 2% indium.

Examples of a typical solder cored wire which may be prepared by a conventional cored wire forming process are as follows:

1. A high temperature solder cored wire consisting of a 10kt gold jacket and a 10kt gold solder alloy which comprises about 42% gold, 40% copper, 15.5% zinc, 0.5% nickel, 2% indium.
2. A low temperature 10kt gold solder cored wire consisting of a 10kt gold jacket and a 10kt gold solder alloy which comprises about 42% gold, 30% copper, 16.5% silver, 9% zinc, 0.5% nickel, 2% indium.
3. A high temperature 14kt gold solder cored wire consisting of a 14kt gold jacket and a 14kt gold solder alloy which comprises about 58% gold, 27% copper, 5% silver, 7.5% zinc, 0.5% nickel, 2% indium.
4. A low temperature 14kt gold solder cored wire consisting of a 14kt gold jacket and a 14kt gold solder alloy which comprises about 58% gold, 29% copper, 10.5% zinc, 0.5% nickel, 2% indium.
5. A high temperature 18kt gold solder cored wire consisting of a 18kt gold jacket and a 18kt gold solder alloy which comprises about 75% gold, 10% copper, 6% silver, 6.5% zinc, 0.5% nickel, 2% indium.
6. A low temperature 18kt gold solder cored wire consisting of a 18kt gold jacket and a 18kt gold solder alloy which comprises about 75% gold, 6% copper, 10% silver, 6.5% zinc, 0.5% nickel, 2% indium.

The difference in ductility between a 14kt gold solder of this present invention and that of the prior art, as measured by hardness readings, is given in the following table, wherein alloys A and B are typical alloys of the present invention and alloys C and D are typical of prior art alloys.

| Alloy | Hardness (DPH, 500 g load) | | Condition after Stated Reduction |
|---|---|---|---|
| | Annealed | Hard | |
| A | 102 | 280 (80% reduction) | no cracking |
| B | 158 | 290 (80% reduction) | no cracking |
| C | 212 | 299 (50% reduction) | cracked |
| D | 196 | 278 (50% reduction) | cracked |

| Alloy | Elemental Compositions (%) | | | | | |
|---|---|---|---|---|---|---|
| | Gold | Silver | Copper | Zinc | Nickel | Cadmium | Indium |
| A | 58 | — | 28.5 | 11 | 0.5 | — | 2 |
| B | 58 | 5 | 27.5 | 7 | 0.5 | — | 2 |
| C | 58 | 21 | 12.5 | 3 | — | 6 | — |
| D | 58 | 14 | 13.0 | 5 | — | 10 | — |

An additional feature of the alloys of the present invention is that they do not require extraordinary heat treatment, in order to restore minimum hardness after cold working. The alloys in the preferred composition range are not age-hardenable.

Another advantage in the use of a solder of the present invention in solder cored wire and other soldered jewellery articles occurs in the recycle of the scrap. In general, composite materials bearing cadmium were recycled by refining to obtain pure gold and pure silver, which were then used in new melting charges. It is not necessary, for reasons of either health or dilution, to refine composite scrap containing cadmium-free solder of the invention. That is, the cadmium-free scrap can be melted, chemically analyzed and directly thereafter be realloyed with raw elements to form new alloys.

It will be apparent to those skilled in the art that various modifications of the preferred alloys are possible. As many changes could be made in the above alloys without departing from the scope of the invention, it is intended that all matter contained in the above description shall be interpreted as illustrative and not in a limiting sense. One modification that could be made is to omit nickel and/or cobalt which are used to refine the grain size of the alloys. Whilst such alloys would not have as fine a grain size as the preferred alloys, they would nonetheless be useful solders.

Unless otherwise indicated, all parts and percentages are by weight.

We claim:

1. A 10kt gold solder alloy consisting essentially of about 42% gold, 40% copper, 15.5% zinc, 0.5% nickel, 2% indium.

2. A 14kt gold solder alloy consisting essentially of about 58% gold, 29% copper, 10.5% zinc, 0.5% nickel, 2% indium.

3. A solder cored wire consisting essentially of a 10kt. gold jacket and a solder core alloy according to claim 1.

4. A solder cored wire consisting essentially of a 10kt. gold jacket and a solder core alloy according to claim 2.

* * * * *